March 29, 1932.   W. R. GRISWOLD   1,851,669
INTERNAL COMBUSTION ENGINE
Filed Feb. 27, 1928
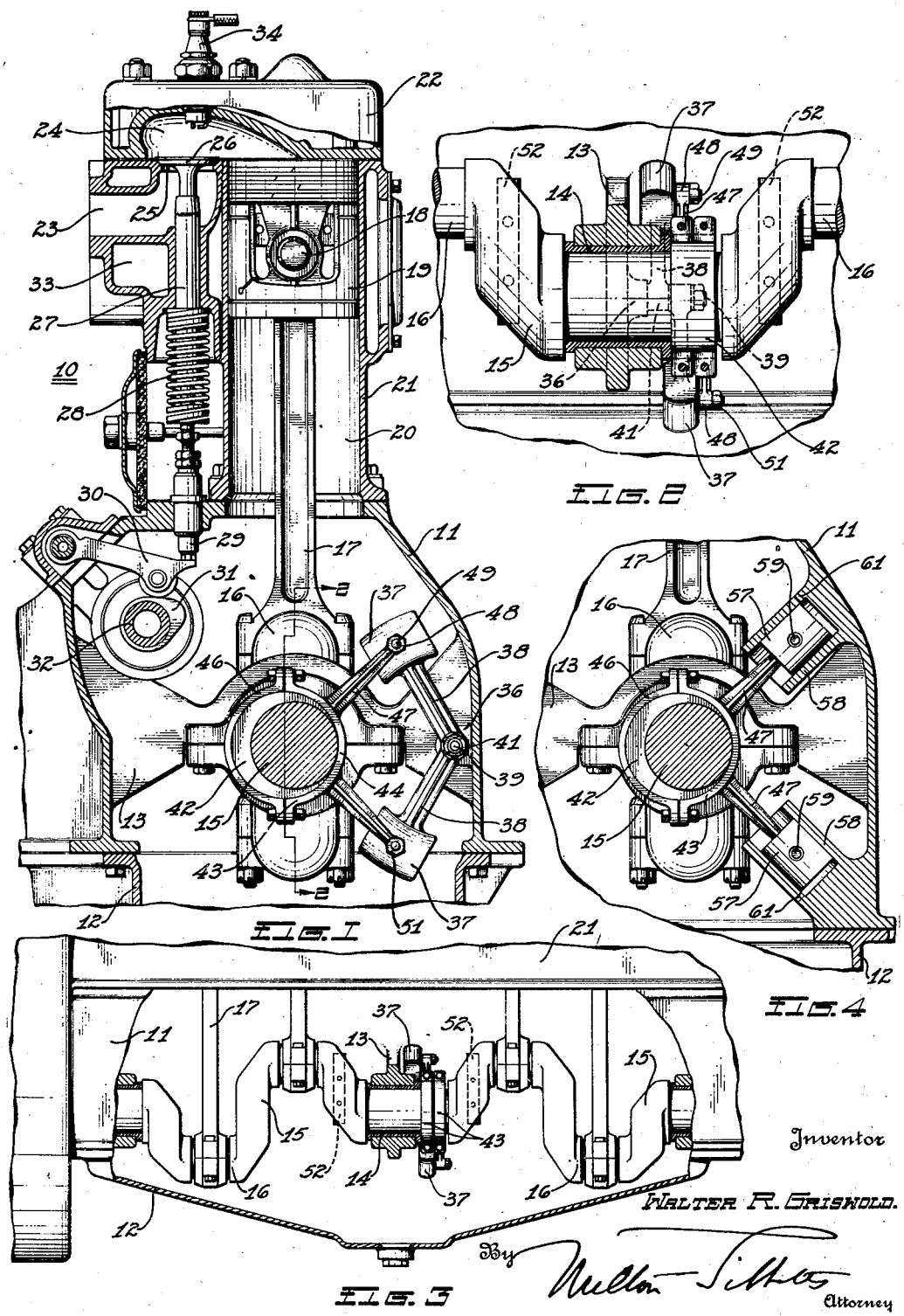
Inventor
WALTER R. GRISWOLD.

Patented Mar. 29, 1932

1,851,669

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed February 27, 1928. Serial No. 257,231.

This invention relates to internal combustion engines and more particularly to the neutralizing or balancing of certain free inertia forces which act on the crank shafts of such engines. It contemplates a method of balancing or canceling out such forces by opposing them with the proper components of other inertia forces derived from a separate balancing system, the other components of such balancer forces being independently balanced, or otherwise eliminated.

The invention is particularly applicable to engines having four-throw crank shafts, such as the well known four-cylinder automobile engine, in which all of the cranks are arranged in a common plane longitudinally of the shaft, and in which the unbalanced forces act in the vertical plane through the shaft axis. It has been disclosed in connection with such an engine, but it is to be understood that the invention is not so limited, but may be applied to any engine in which free or unbalanced inertia forces act on the crank shaft.

It is well known that much of the roughness in certain types of engines is caused by the secondary inertia forces, which are second order harmonic components of the total inertia force and which do not cancel out but have a definite resultant, causing an appreciable reaction on the engine supports. It has been proposed to neutralize these secondary inertia force by rotary balancing devices, and also by reciprocating or oscillating balance weights driven from the engine crank shaft through toggle linkages of various kinds, which provide two vibrations of the weights for each revolution of the shaft. The undesirable high speed gearing required by rotary balancing devices is avoided in such oscillatory balancers, but such constructions have other disadvantages. The linkage itself is complicated and clumsy, and introduces some further unbalance into the system.

One of the objects of this invention is to provide an improved method of balancing the inertia forces acting on an engine shaft.

Another object of the invention is to provide an internal combustion engine with a simple and compact balancing system or device having weight or inertia members which move at crank shaft speed.

Another object of the invention is to provide such an engine balancer in which the weight or inertia members are directly connected to and driven from the engine crank shaft, without the interposition of speed or movement multiplying means.

Another object of the invention is to provide a balancer for engine crank shafts having a pair of inertia members so disposed as to balance the secondary inertia forces of the crank shaft when driven directly from the crank shaft without toggles or other complicated linkages.

Another object of the invention is to provide engine balancing means in which the inertia members are constrained to movement in a fixed path without heavy reactions on the guiding and supporting means.

Another object of the invention is to provide such balancing means which shall have no highly stressed members, shall not occupy excessive space in the engine crank case, and which shall be inexpensive to build and maintain.

Other objects of the invention will appear from the following description taken in connection with the drawings, which form a part of this specification, and in which:

Fig. 1 is a transverse sectional view through an internal combustion engine having balancing means embodying this invention;

Fig. 2 is a detail view, partially in section substantially on the line 2—2 of Fig. 1;

Fig. 3 is a view in side elevation, partially broken away and partially in section, and to a somewhat smaller scale, of a part of the engine shown in Fig. 1, and Fig. 4 is a transverse sectional view showing a modified form of the invention.

Referring to the drawings, at 10 is shown an internal combustion engine having a crank case 11 provided with a lower closure forming an oil pan 12. The crank case is provided with transverse webs such as 13, in which are mounted bearings 14 for the engine crank shaft 15, which in the embodiment illustrated is of the well known four-throw type. Each of the cranks 16 of the crank shaft 15 is connected by a rod 17 and a pin 18 to a piston 19, slidably mounted in one of the engine cylinders 20 in the usual manner.

The cylinders 20 may be conveniently formed in an integral cylinder block 21, secured upon the crank case 11 and provided with a removable cylinder head 22. The cylinder block 21 is also provided with the usual intake passages 23, and with similar exhaust passages (not shown), which are connected to combustion spaces 24 in the head 22 by ports 25. These intake and exhaust ports are each controlled by a valve, such as 26, which may be of the well known poppet type, slidably mounted in a guide 27 and urged toward its closed position by a suitable valve spring 28 in the well known manner. These valves may be actuated through valve followers 29 and rocker arms 30 from cams 31 on an engine camshaft 32, driven in timed relation to the crank shaft 15 in any suitable manner.

The cylinder block and head are also preferably formed with cooling passages 33 for the circulation of a cooling medium, and the head is provided with suitable ignition apparatus such as the spark plugs 34.

The balancing means of this invention is preferably mounted within the crank case 11 near the middle thereof. As shown in Fig. 1, the mounting is a lug 36, integral with the crank case wall, on which the weight or inertia members 37 are pivotally supported. The lug is arranged adjacent to and may be integral with the web 13 of the center shaft bearing 14, so that the weight members may operate substantially in the transverse plane of the bearing without interference with the cranks.

Each of the weight or inertia members 37 is provided with a radius arm 38 which may be integral therewith or rigidly attached thereto, and which is pivoted at the other end for oscillatory movement about a common point on the lug 36, which is the center of oscillation of the weight members. The center may be conveniently formed by a pin or stud 39, screwed into the lug 36, and cooperating with a suitable eye 41 in the end of the arm 38. In this way the weight members are restrained by the arms to movement in short circular arcs about the pin 39.

The weight members are driven from and in synchronism with the crank shaft 15, to which they are directly connected. For this purpose the crank shaft is formed with an eccentric 42, preferably integral therewith, which is located adjacent the center main bearing 14. This eccentric is arranged in a definite angular or phase relation to the crank shaft, and in the embodiment shown is disposed at 90° to the plane of the cranks 16, as clearly shown in Fig. 1. Side by side on this eccentric are mounted a pair of eccentric followers or straps 43, each comprising a rod portion 44 and a cap portion 46 removably secured to the rod portion in the well known manner. Integral with the rod portion 44 of each eccentric follower is an eccentric rod 47 terminating in a bearing eye 48, by which it is pivotally connected to one of the weight or inertia members 37, which connection may be conveniently effected by a pin 49, threaded into the side of the weight member 37, and having a nut 51 by which the eye 48 is retained on the pin.

It will be understood that the eccentric rods are disposed at an angle of 90°, one being connected to the upper and the other to the lower weight member. By reason of the direct connection afforded by these rods, the weight members 37 are oscillated through short arcs determined by the arms 38, and in synchronism with the crank shaft, that is each of the weights makes one complete oscillation for each revolution of the crank shaft.

In order to relieve the pin 39 and its supporting lug of large reaction stresses, and to reduce the necessary mass of the weight members, the pin 49 is preferably arranged on an axis passing through the center of percussion of the member with respect to the pivot 39, which center, in the particular embodiment illustrated, lies close to the center of gravity of the weight member. By this arrangement the reaction forces at the pin 39 are very small, being limited to the radial acceleration of the weight member caused by its arcuate movement. As the length of the arc of travel is short compared with its radius the radial component of this motion is practically negligible, and the path of travel may be considered as a straight line. By this construction also, the inertia forces of the weight members 37 are directly transmitted to the eccentric rod 47, so that the necessary balancing pressure is secured by a much smaller weight than would otherwise be the case.

The total inertia forces of the balancing system are therefore exerted on the crank shaft 15 through the rods 47 and the eccentric 42, and these forces are periodic and in synchronism with the engine forces. They may be resolved into primary and secondary components, the primary component being a constant, while the secondary component is a harmonic variable and out of phase with the shaft forces by reason of the disposition of the eccentric 42 on the shaft.

In the applicant's method of balancing, the unbalanced shaft forces are directly neutralized by the similar component of the balancing forces, which is the secondary component, and as these are of the same frequency it is not necessary to double the frequency of the balancing system. Instead, the constant primary force is independently eliminated, and by a proper angular disposition the secondary forces are caused to balance the shaft.

In the present embodiment of the invention, the primary force component exerted by the weight members 37, takes the form of a rotating vector of constant magnitude, and this may be readily eliminated by simple rotary balance weights 52. These weights are conveniently secured to the crank cheeks adjacent the center bearing 14 in any desired manner, and rotate with the crank shaft to neutralize or balance out the primary force mentioned. Suitable compensation for the static unbalance of the crank shaft, by reason of the off center mass of the eccentric 42, may be conveniently combined in these rotary weights 52, since this unbalance is also a rotary force which may be readily combined with the primary inertia force into a constant resultant.

The secondary component may be further resolved into component forces acting parallel and normal to the plane of action of the engine forces. In the embodiment of the invention herein described these components are horizontal and vertical. By reason of the angular relationship chosen between the eccentric rods and the plane of action of the forces, the horizontal components cancel out when transferred to this plane of action, leaving the vertical component acting on the unbalanced engine forces in opposite phase relation, whereby these unbalanced engine forces are neutralized.

In Fig. 4 is illustrated a modified form of the construction shown in Figs. 1 to 3. In this embodiment of the invention the weight members 57 are preferably cylindrical in form and are mounted to reciprocate in cylindrical guides 58, which may be formed integrally with the crank case 11. The axes of these cylindrical guides are disposed substantially at right angles to and above and below the horizontal plane of the crank shaft, and the weight members 57 are reciprocated therein directly from the crank shaft 15 through the eccentric 42, the eccentric follower and the eccentric rod 47, as in the form of the invention previously described. In this form of the device the eccentric rods 47 are connected to the weight members 57 by pins 59, which are located as nearly as practicable at the center of gravity of the weight members, so that the cylindrical guides 58 are relieved of most of the reaction forces, and the mass of the weight members is reduced to a minimum. The cylindrical guides 58 may be provided with ports 61 to secure free movement of the members 57 therein, and to prevent the consumption of engine power resulting from compression of crank case air and vapor in the ends of the guides.

It will be evident that this invention provides an improved method of balancing engines wherein the forces causing the unbalance are opposed by other forces similar in kind and in order, such extraneous forces as are incident to the balancing force being separately eliminated. In this way a simple balancing system, operable at engine speed, is made possible.

It will also be evident that the invention provides a simple, direct and effective balancing device in which the weight or inertia members are connected directly to the engine crank shaft, and which has no highly stressed toggle links, joints or other members, and which contains no high speed gearing. Moreover, it will be seen that by the connection of the eccentric rod to the weight member at the point of no reaction, or center of percussion, large reaction stresses are removed from the supporting lug, the crank case, and other parts of the engine.

It will be understood that various forms of the invention other than those described above may be used without departing from the spirit or scope of the invention.

Having thus described the invention, what is claimed and desired to be secured by Letters Patent, is:

1. The method of balancing the secondary inertia forces of an engine crank shaft which consists in opposing the said inertia forces by the combined forces of a balancing system, and simultaneously and independently balancing the constant primary force of said balancing system.

2. The method of balancing the secondary inertia forces of an engine crank shaft which consists in driving a separate balancing system from said shaft, imposing on the shaft the inertia forces of said balancing system in opposite phase relation, and independently balancing the constant component of said imposed forces.

3. The method of balancing the secondary inertia forces of an engine crank shaft, which consists in imposing on said crank shaft both the variable and the constant force components of an extraneous balancing force in opposite phase relation to said engine forces, and removing said constant component by separately counterweighting the crank shaft.

4. The combination with an internal combustion engine having a crank shaft, of a pair of inertia members pivotally mounted to oscillate about fixed centers on the engine, a driving member on the crank shaft in predetermined angular relation thereto, and means connecting the driving member with each of said inertia members at the center of percussion thereof referred to its center of oscillation.

5. The combination of an internal combustion engine having a crank case and a crank shaft journaled therein, of a balancing device comprising a weight member having an integral arm pivotally secured to the crank case, an eccentric integral with the crank shaft adjacent a journal bearing thereof, and an eccentric rod operable by the eccentric and pivotally connected to the weight member at the center of percussion thereof.

6. The combination of an internal combustion engine having a crank case and a crank shaft journaled therein, a pair of weight members movably mounted on the crank case, an eccentric on the crank shaft having a definite angular position thereon, and a pair of eccentric straps on the eccentric, each connected to one of the weight members to move said members in a definite phase relation.

7. The combination with an internal combustion engine having a crank shaft with cranks arranged in a common plane, of an eccentric on said shaft disposed at right angles to said crank plane, a pair of inertia members mounted to oscillate on the engine in paths symmetrical to and on opposite sides of the horizontal plane of the shaft, and means to actuate said inertia members from said eccentric and in synchronism therewith.

8. A balancing device for the secondary inertia forces of an internal combustion engine having a crank shaft, comprising inertia members movably mounted on said engine, means directly connecting the inertia members to the crank shaft in a predetermined phase relation for movement at the same rate, whereby part of the inertia forces of the inertia members balance the secondary inertia forces of the engine, and means on said crank shaft to balance the remainder of the forces of said inertia members.

9. A balancing device for the inertia forces of an engine crank shaft comprising movable inertia members, an eccentric on the shaft to drive said inertia members and a balance weight on the shaft to balance said eccentric and a portion of the force of said inertia members.

10. The combination with an internal combustion engine of which the secondary inertia forces act in the vertical plane of the crank shaft, of a balancing device for said forces comprising inertia masses mounted for movement in paths symmetrical to the horizontal plane of the crank shaft, an eccentric on said crank shaft, and eccentric straps connecting each inertia mass to said eccentric by rods disposed substantially at right angles to each other.

In testimony whereof I affix my signature.

WALTER R. GRISWOLD.